Sept. 20, 1960   F. BRENDEL   2,953,191
SEATS FOR MOTOR VEHICLES
Filed Nov. 5, 1957   2 Sheets-Sheet 1

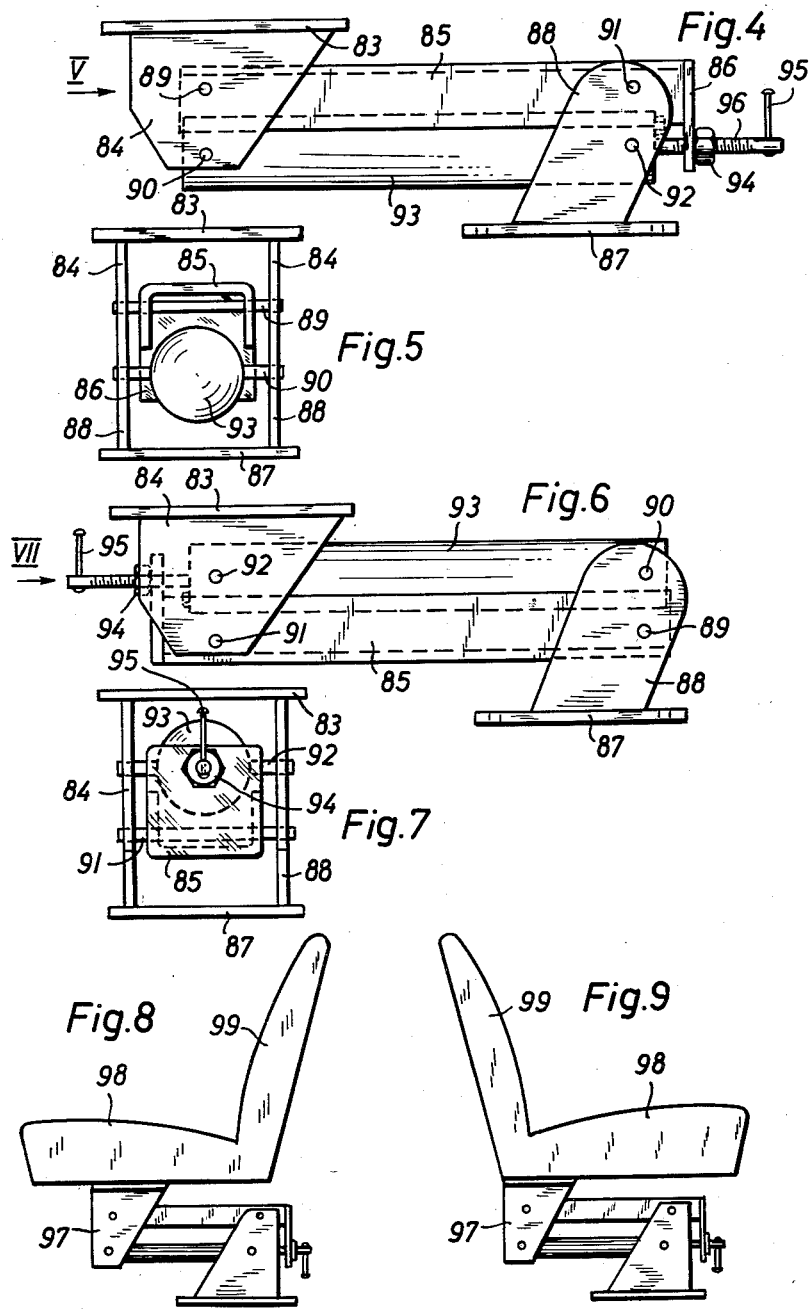

United States Patent Office 2,953,191
Patented Sept. 20, 1960

2,953,191

SEATS FOR MOTOR VEHICLES

Friedrich Brendel, Saalstadt, Germany, assignor to Bremshey & Co., Solingen-Ohligs, Germany Filed Nov. 5, 1957, Ser. No. 694,661

Claims priority, application Germany Nov. 6, 1956

3 Claims. (Cl. 155—51)

The invention relates to a seat for motor vehicles with cushioning and shock absorption, the seat of which is connected to a rigid base frame by means of a parallelogram system of guide rods controlling the movement of the seat in a straight line. Such seats for motor vehicles are known. They are characterized by great comfort due to the combination of cushioning, shock-absorbing and straight guiding, with the result that the driver in particular tires less easily. The known seats of this type are, however, open to the objection that the structural elements take up a considerable amount of space. Consequently it is not possible in many cases to install the seat in the space available in the interior of a vehicle which is frequently very restricted.

The object of the invention is to produce a seat of a construction which takes up but little space yet possesses all the functional advantages of the known seats. According to the invention, the part connected to the second rod of the parallelogram system is slidable in relation to the first rod and the first rod forms with this part a cylinder and piston or piston and cylinder combination acting as a hydraulic shock absorber, a spring being arranged in the cylinder which bears against the piston. At the same time the first rod can be either the upper rod or the lower rod of the parallelogram system. Therefore, in the case of the seat according to the invention, one of the two rods is at the same time an important element of the shock absorber and cushioning device. Thus, a construction is obtained which occupies practically no more space than a seat of known type equipped with parallelogram guide rod system. The vehicle seat according to the invention is characterized by its low constructional height and light weight.

In the preferred form of construction according to the invention, the cylinder constitutes the first guide rod, whereas the piston is connected with the second guide rod. The arrangement can also be reversed but does not then possess the additional advantages attainable by the preferred form of construction.

The vehicle seat according to the invention can likewise be improved by making the part connected to the second guide rod adjustable to the second guide rod. Thus it is possible to bring the loaded seat to the height actually required in a simple manner.

The cushioning is preferably so constructed that the spring is already stressed when the seat is not loaded, that is, it is prestressed. This prestressing is made adjustable according to a further improvement of the subject matter of the invention, in that the piston is mounted on a piston rod provided with a screw thread and the piston rod can be turned from outside.

Other objects of the invention and other advantages obtainable by the invention will become apparent from the several forms of construction hereinafter described by way of example with reference to the accompanying drawings, in which Fig. 1 is a diagrammatic view partly in section showing the first form of construction;

Fig. 4 shows in side elevation the seat frame of the construction illustrated in Fig. 2 but with slight structural modifications;

Fig. 5 is an end view looking in the direction of the arrow V in Fig. 4;

Fig. 6 is a side elevation corresponding to Fig. 4 but with some of the parts reversed;

Fig. 7 is an end view looking in the direction of the arrow VII of Fig. 6, and

Figs. 8 and 9 show in a simple diagrammatic form two different possibilities of arranging the seat frame in relation to the rigid support.

Figure 1:
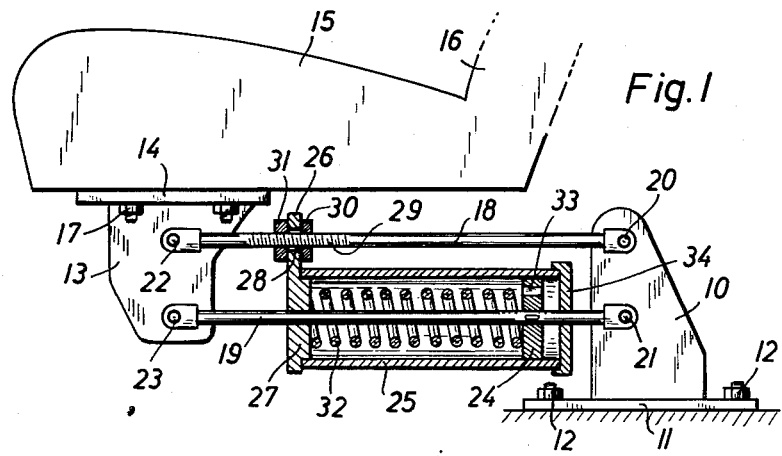

According to Fig. 1, the seat consists of a rigid support or base frame 10 the foot 11 of which is fixed on the floor of the vehicle by means of bolts 12. It carries a movable frame 13 with head plate 14 on which the seat upholstering 15 with the back rest 16 is secured by bolts 17. Two parallel guide rods 18 and 19 articulated on the base frame by joints 20 and 21 serve for connecting the movable seat frame 13 with the rigid support or base frame 10. The guide rods 18 and 19 are of the same length and the distance between the joints 20 and 21 mounting the rods to the movable frame 13 is the same as the distance between the joints 22 and 23. The parts 10, 13, 18 and 19 therefore form a parallelogram guide rod system.

A piston 24 is fixed on the guide rod 19 and slidable in a cylinder 25. A projection 26 on the left hand cylinder cover 27 extends over the guide rod 18 and has a bore 28 with the aid of which it is longitudinally slidable on the guide rod 18. The guide rod 18 is provided with a screw thread 29 on which two nuts 30 and 31 are mounted and by means of these nuts the projection 26 can be fixed on the guide rod 18.

A spiral spring 32 is located between the piston 24 and the cylinder cover 27. The piston 24 with the cylinder 25 constitute together a hydraulic shock absorber. For this purpose the piston 24 is provided with a passage 33 and the cylinder 25 is closed at the right hand end by means of a cover 34. It can easily be seen that the movement of the piston 24 in the cylinder 25 is damped if the cylinder is filled with oil.

If the seat is loaded, the piston 24 shifts towards the left, relative to cylinder 25, as the seat frame 13 moves in a downward direction, so that the spring 32 is compressed until the load and resilient force are in equilibrium. Jolts of the vehicle are taken up by the spring. The movement resulting therefrom is damped.

The height of the seat surface above the floor when the seat is not loaded can be adjusted as desired within certain limits by adjusting the position of the projection 26 on the guide rod 18. For this purpose the nuts 30 and 31 are displaced on the screw thread 29.

The construction illustrated in Fig. 1 requires much less space than the known forms of construction in which the cushioning and shock absorbing means do not constitute parts of the parallelogram guide rod system but are separate parts requiring additional space. However, the form of construction illustrated in Fig. 1 is open to objections. The adjustment of the height of the seat is inconvenient on account of the nuts being in a position where they are not easily accessible and can only be carried out with difficulty if the vehicle is in daily use. Another objection is that the guide rod 19, which constitutes the piston rod of the piston 24, passes out of the cylinder at both ends.

Figure 2:
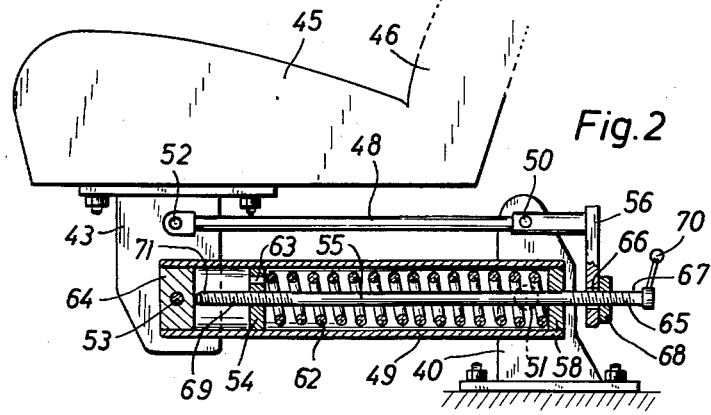
Fig. 2 is a similar view of a second form of construction.

These objections are overcome in the preferred form of construction of the invention illustrated in Fig. 2. Therein as in Fig. 1, the seat frame 43 is connected with the fixed support or base frame 40 by two guide rods 48 and 49 of the same length with the aid of joints 50, 51, 52 and 53. But in this case the guide rod 49 is in the form of a cylinder for a piston 54 the piston rod 55 of which passes through the cover 58 at the right-hand end of the cylinder and is connected at its extremity to the guide rod 48 by means of a projection 56. This projection is, for example, welded on the end of the guide rod 48. A spring 62 is arranged between the piston 54 and the cylinder cover 58. The rod or cylinder 48 is filled with oil and the piston 54 has a bore 63 so that the whole assembly forms a shock absorber.

If the seat is loaded, the spring 62, as in the case of the spring 32, is compressed and jolts of the vehicle are cushioned and taken up by this spring. At the same time it is not necessary to pierce the second cylinder cover 64 for the passage of the piston rod 55. In addition the possibilities of adjustment are much simpler.

The outwardly extending end 65 of the piston rod 55 passes through a hole in the projection 56 and is provided with a screw thread 67 on which a nut 68 is turnable. Under the weight of the seat frame 43 and upholstering 45 and back rest 46 the projection 56 is maintained in contact with the nut 68. If the nut 68 is shifted, the height of the seat is changed. Furthermore the seat frame can be raised above the position it assumes in unloaded state if, for example, it is desired to obtain more space when entering the vehicle. The projection 56 then moves away from the nut 68 and it is not necessary to overcome the resistance offered by the resilient force and damping force.

The piston 54 is mounted on the piston rod 55 by means of a screw thread 69 and the piston rod 55 can be turned by means of a tommy bar 70 mounted at its outer end. The piston is prevented from participating in the turning motion by the frictional pressure exerted by the spring 62. The left hand end 71 of the piston rod 55 is also kept in contact with the cover 64 by spring pressure. The turning of the piston rod therefore results in a longitudinal displacement of the piston accompanied by a corresponding compression or release of the spring 62. The prestressing of the spring can therefore be adjusted with the aid of the tommy bar 70. The two means of adjusting the height of the seat and prestressing the spring are in the form of construction illustrated in Fig. 2 arranged at places where they are easily accessible. Both can therefore be conveniently brought into the desired position by the driver.

Figure 3:
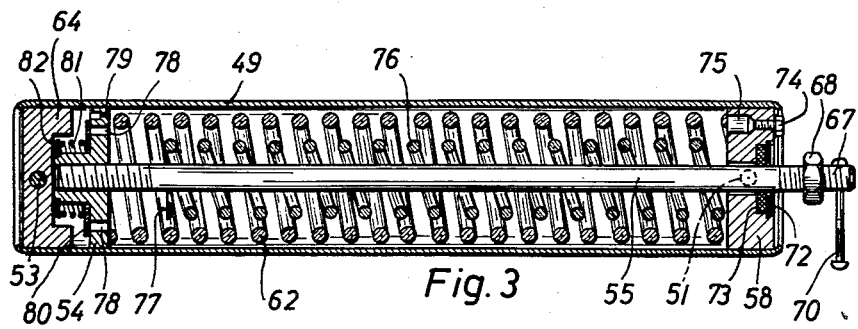
Fig. 3 is a longitudinal section through the element serving for cushioning and shock-absorbing.

Fig. 3 shows further details of the device serving for cushioning and shock absorbing, which are omitted from Fig. 2 for the sake of clearness.

Parts which have already been described in connection with Fig. 2 are designated by the same reference numerals.

In the right hand cylinder cover 58 a gasket 73 is fixed by means of a retainer ring 72 for the piston rod 55 projecting therethrough and a bore 75 which can be closed by a screw 74 is provided for the shock absorbing oil. In addition to the spring 62, the prestressing of which is adjustable in the manner described, a second spring 76 of shorter length is also accommodated in the cylinder. This spring 76 only becomes operative when the piston 54 strikes against its end face 77 under heavy load caused by jolts or shocks.

Relatively wide bores 78 are provided to allow the passage of the oil as the piston moves towards the right, that is as the seat frame descends, whereas only a narrow bore 79 is provided for the passage of the oil when the piston moves in the opposite direction. The bores 78 are closed by a plate 80 when the piston is at rest or moves towards the left. To effect the closure the plate 80 is loaded by a relatively weak spring 81 which bears lightly against the disk 82 fixed on the piston 54.

The form of construction illustrated in Figs. 4 and 5 corresponds substantially with that shown in Fig. 2 with a few structural modifications. The seat frame consists of a plate 83 with two cheeks 84. The upper guide rod consists of a channel section 85 the right end of which carries a projection which is welded on and corresponds to the projection 56 but is in the form of a plate 86. The base or fixed frame consists of a base plate 87 with two cheeks 88. Pins 89, 90 fit in holes in the cheeks 84 and form the front joints and corresponding pins 91 and 92 engage in holes in the cheeks 88 and form the rear joints of the parallelogram. 93 is a cylinder corresponding to the part 49 in Fig. 2. For the height adjustment of the seat a nut 94 is again provided. The prestressing of the spring may be controlled by a tommy bar 95 on the outwardly projecting piston rod 96.

Figs. 6 and 7 show that by reversing the guide rod system the adjusting means 94 and 95, which in Fig. 4 are situated on the base frame end, can be located on the seat frame end of the device. All the parts remain unchanged.

Finally Figs. 8 and 9 show how an upholstered seat 98 with back rest 99 can be secured on the seat frame 97 of the seat according to Figs. 4 to 7, taking into consideration the existing space available. It will easily be seen that in the case of the seats shown in Figs. 8 and 9 the guide rod system can be reversed as is shown in Figs. 6 and 7.

I claim:

1. A device for cushioning a vehicle seat comprising a fixed base frame, a displaceable seat frame, lower and upper substantially horizontal parallel spaced guide link elements connecting said base frame with said seat frame, the lower of said elements comprising a hydraulic shock absorber cylinder provided with an upwardly directed extension, a piston slidable in said cylinder, a spring in said cylinder bearing against said piston, a piston rod slidable in said cylinder and extending through the cylinder ends, said piston rod having its ends pivotably secured to said fixed base frame and said seat frame, respectively, said upper link element being in engagement with said extension.

2. The device as set forth in claim 1, further provided with means for adjusting said guide rod with respect to said extension on said lower guide rod.

3. The device according to claim 2, wherein said upper link is provided with a screw thread and said extension with an opening for the passage of said upper link and an adjusting nut movably mounted on the screw thread and bearing against said extension.

References Cited in the file of this patent

UNITED STATES PATENTS

| 703,713 | Smith et al. | July 1, 1902 |
| 2,639,141 | Gabriel | May 19, 1953 |
| 2,667,209 | Gundersen | Jan. 26, 1954 |
| 2,821,239 | Brendel | Jan. 28, 1958 |

FOREIGN PATENTS

| 22,716 | Great Britain | A.D. 1894 |
| 27,103 | Great Britain | A.D. 1913 |
| 928,573 | Germany | June 2, 1955 |